(12) United States Patent
Mäkelä

(10) Patent No.: US 7,392,151 B2
(45) Date of Patent: Jun. 24, 2008

(54) INITIALIZING POSITION AND DIRECTION OF MINING VEHICLE

(75) Inventor: Hannu Mäkelä, Helsinki (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 10/550,309

(22) PCT Filed: Mar. 25, 2004

(86) PCT No.: PCT/FI2004/000171

§ 371 (c)(1),
(2), (4) Date: Mar. 8, 2006

(87) PCT Pub. No.: WO2004/086161

PCT Pub. Date: Oct. 7, 2004

(65) Prior Publication Data

US 2006/0265166 A1    Nov. 23, 2006

(30) Foreign Application Priority Data

Mar. 25, 2003   (FI) .................................. 20030442

(51) Int. Cl.
*G06F 15/00* (2006.01)
(52) U.S. Cl. ........................................................ 702/150
(58) Field of Classification Search ............... 702/94, 702/95, 150, 151; 701/202, 207–209
See application file for complete search history.

(56) References Cited

U.S. PATENT DOCUMENTS

| 599,865 | A | 3/1898 | Richards ....................... 701/25 |
| 5,530,330 | A | 6/1996 | Baiden et al. ................ 318/580 |
| 5,572,428 | A | 11/1996 | Ishida et al. ................. 364/461 |
| 6,018,697 | A * | 1/2000 | Morimoto et al. ........... 701/209 |
| 6,055,042 | A | 4/2000 | Sarangapani ............... 356/4.01 |
| 6,163,745 | A | 12/2000 | Purchase et al. .............. 701/23 |
| 6,349,249 | B1 | 2/2002 | Cunningham ................ 701/28 |
| 6,393,362 | B1 | 5/2002 | Burns ......................... 701/301 |
| 6,608,913 | B1 * | 8/2003 | Hinton et al. ............... 382/104 |
| 7,191,060 | B2 * | 3/2007 | Makela ....................... 701/209 |

FOREIGN PATENT DOCUMENTS

| EP | 1 176 393 | 1/2002 |
| WO | 02/30792 | 4/2002 |

* cited by examiner

*Primary Examiner*—Michael P. Nghiem
(74) *Attorney, Agent, or Firm*—Drinker Biddle & Reath LLP

(57) ABSTRACT

A method of initializing the position and direction of a mining vehicle, and a mining vehicle. An environmental model and route points are stored in a control system of the vehicle. The environment of the vehicle is scanned, and scanned points are generated based on obstacles observed. The control system is arranged to determine coordinates of the scanned points by using the position of the route points within a search range and at least one direction. The coordinates calculated for the scanned points are compared with the environmental model. Such a route point and direction are selected as initial values for the mining vehicle, by which the generated coordinates of the scanned points best match the environmental model.

11 Claims, 2 Drawing Sheets

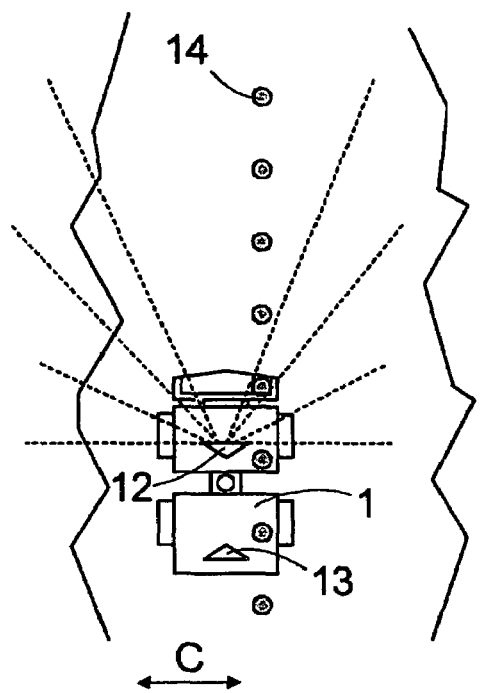
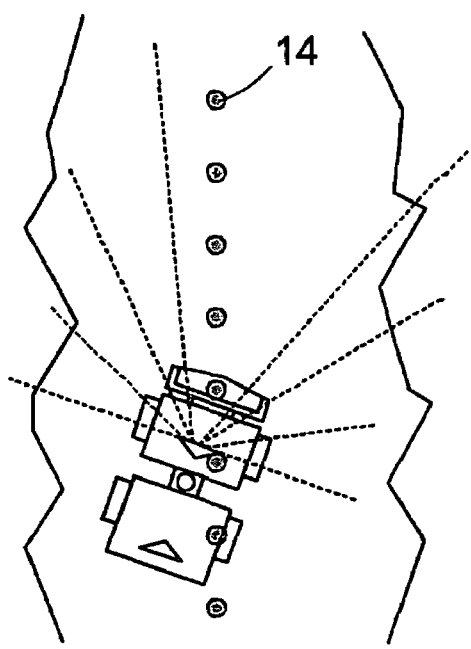
FIG. 4        FIG. 5
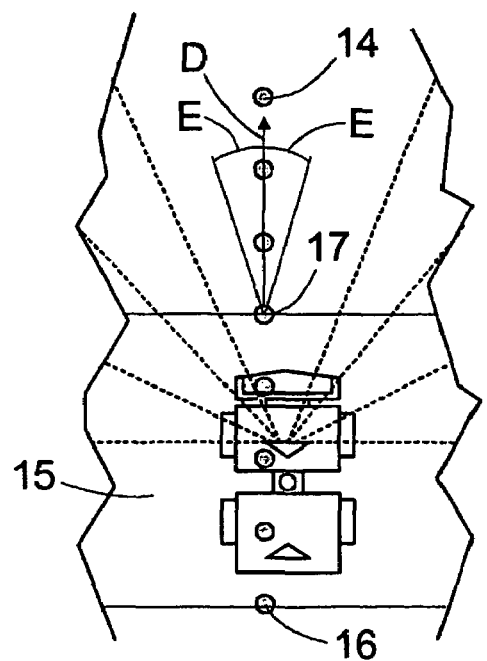
FIG. 6

INITIALIZING POSITION AND DIRECTION OF MINING VEHICLE

FIELD OF THE INVENTION

The invention relates to a method of initializing the position and direction of a mining vehicle, the mining vehicle comprising a movable carrier and a control system, and wherein the control system is arranged to read an electronic environmental model including data on coordinates of an environment delimiting a route; and a route including at least the coordinates of route points of the route to be driven, and in which method: the environment of the mining vehicle is scanned, and scanned points are determined on the basis of obstacles detected by the scanning.

The invention further relates to a mining vehicle comprising at least: a movable carrier; a control system including at least one control unit arranged to read an electronic environmental model including data on coordinates of an environment delimiting a route; and a route including at least the coordinates of route points of the route to be driven; and at least one scanner for detecting obstacles in the environment of the vehicle; and means for determining scanned points on the basis of the results of the scanning.

BACKGROUND OF THE INVENTION

An unmanned mining vehicle can be automatically driven in a mine along a predetermined route when the direction of the vehicle and the length of travel are known. The route may be stored as an electronic map in the control system of the vehicle. The initialization of automatic driving is subject to accurate knowledge of the position and direction of the vehicle. Particularly when the positioning of a mining vehicle is not based on the use of positioning systems adapted in advance to a mine, problems have been observed in the determination of the starting position and starting direction of the vehicle.

BRIEF DESCRIPTION OF THE INVENTION

The object of the present invention is to provide a new and improved arrangement for initializing the place and position of a mining vehicle before starting to drive the vehicle along the desired route.

The method of the invention is characterized by determining a search range including at least part of the route points of the preplanned route of the mining vehicle; selecting each route point within the search range at a time as the position of the mining vehicle; calculating coordinates for the scanned points of the scanning by using each route point within the search range and at least one direction; comparing the coordinates calculated for the scanned points with the environmental model; and selecting such a route point and direction as the initial values of the vehicle, the coordinates of the scanned points of which best match the environmental model.

A second method of the invention is characterized by selecting one route point as the initial point of the search; selecting a plurality of other route points for observation starting from the initial point; calculating coordinates for the scanned points of the scanning by using the selected route points and at least one direction; comparing the coordinates calculated for the scanned points with the environmental model; and selecting such a route point and direction as the initial value of the vehicle, the coordinates of the scanned points of which fulfil a predetermined criterion.

The mining vehicle of the invention is characterized in that the control system is arranged to determine coordinates for the scanned points by using the position of the route points within a predetermined search range and at least one direction; that the control system is arranged to compare the coordinates calculated for the scanned points with the environmental model; and that the control system is arranged to select such a route point and direction as the initial values of the vehicle, by which the generated coordinates of the scanned points best match the environmental model.

A second mining vehicle of the invention is characterized in that the control system is arranged to determine the coordinates of the scanned points by using the position of one selected route point and at least one direction as the initial point; that the control system is arranged to determine coordinates of the scanned points for a plurality of route points starting from the initial point; that the control system is arranged to compare the coordinates calculated for the scanned points with the environmental model; and that the control system is arranged to select such a route point and direction as the initial values of the vehicle, by which the generated coordinates of the scanned points fulfil a predetermined criterion.

The essential idea of the invention is to initialize the exact position and direction of the mining vehicle before starting to drive the vehicle along a route. For initializing the position and direction, the control system comprises an algorithm arranged to calculate coordinates for scanned points obtained from the environment by scanning. For calculating the coordinates, a route point located within a predetermined search range is selected as the position of the vehicle. In addition, at least one direction to be observed is selected to the calculation of the coordinates. The initialization algorithm calculates the scanned points for each route point within the search range and for the selected direction. Each calculated coordinate of a scanned point is compared with an environmental model, and the deviations are observed. Once all route points and directions have been gone through, such a position and direction are selected as the initial value of the vehicle, by which the generated coordinates of the scanned points match the environmental model best. In an alternative method, one route point, for which the coordinates of the scanned points are calculated, is selected as the initial point of the algorithm. More route points are then selected starting from the initial point, and the coordinates of the scanned points are calculated for each point. The search is continued until a route point is found that fulfils predetermined criteria.

An advantage of the invention is that no fixed infrastructure has necessarily to be arranged in the mine; instead, the initialization can be performed on the basis of the topology of the route to be driven. This avoids the installation of fixed reference points, and the mine can be taken into use more quickly.

The essential idea of an embodiment of the invention is that the direction of the route is selected as a first direction of each route point, and the coordinates are calculated. Furthermore, the direction is changed in steps by a predetermined tolerance for each route point observed, and the coordinates of each direction are again calculated for comparison.

The essential idea of an embodiment of the invention is that before the initialization algorithm is started, a search range of the desired size is outlined around the vehicle. The algorithm is adapted to initialize the position and place of the vehicle within said search range. Outlining the search range speeds up the initialization, since the algorithm only goes through the route points within the outlined range.

BRIEF DESCRIPTION OF THE FIGURES

The invention is described in more detail in the accompanying drawings, in which.

For the sake of clarity, the figures show the invention in a simplified manner. Like parts are designated by like reference numerals.

DETAILED DESCRIPTION OF THE INVENTION

Figure 1:
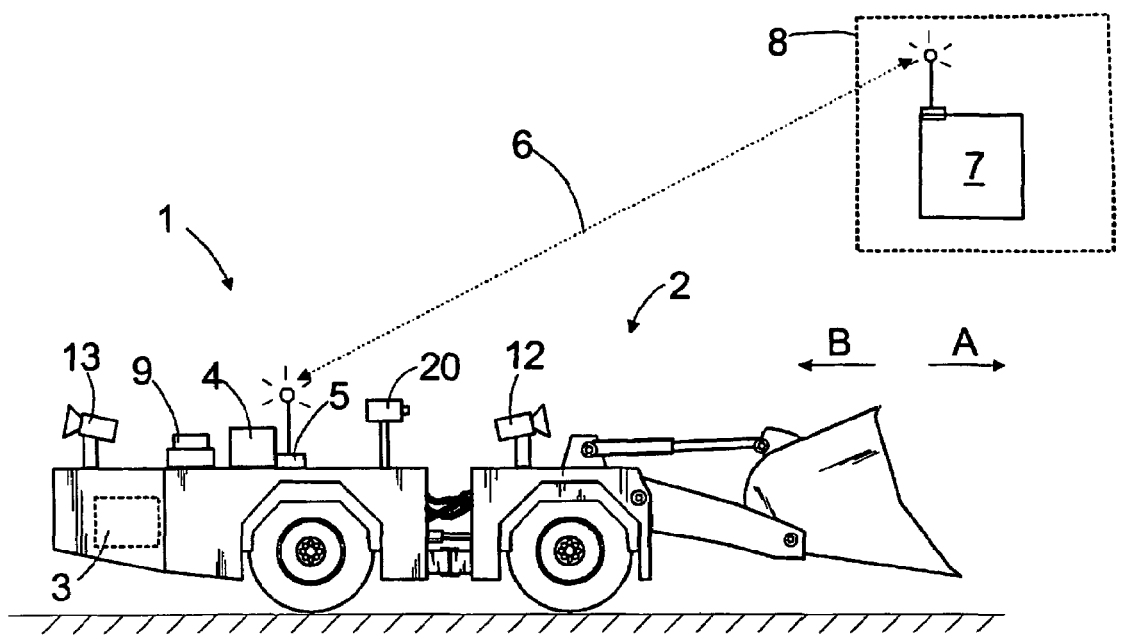
FIG. 1 is a schematic side view of a mining vehicle of the invention.

FIG. 1 shows a mining vehicle 1, in this case a loading vehicle whose front end comprises a bucket for transporting and loading the material mined. Alternatively, the mining vehicle 1 may be for instance a rock drilling rig or a transport vehicle provided with a platform. The mining vehicle 1 comprises a movable carrier 2 arranged to be moved by an engine 3 by the action of power transmission and wheels. In addition, the mining vehicle 1 is provided with a control system comprising at least a first control unit 4 placed on the carrier 2 and adapted to control, among other things, actuators in the mining vehicle 1 for controlling and driving the vehicle. Furthermore, unmanned mining vehicles 1 are provided with a data transfer unit 5 by means of which a data transfer connection 6 can be established between the first control unit 4 and a second control unit 7 that is external to the mining vehicle 1. The second control unit 7 may be located in a control room 8, which may be arranged outside the mine. The data transfer connection 6 between the control room 8 and the mining vehicle 1 may be based on a radiotelephone system, for example. The control units 4 and 7 may be computers or corresponding devices. Furthermore, the control system may comprise a navigation apparatus 9 for positioning, i.e. determining the position and direction of, the mining vehicle 1. For determining the direction, the navigation apparatus 9 may comprise a gyroscope or a corresponding device, for example. The path travelled may in turn be measured for instance in a manner known per se from the power transmission or wheel of the vehicle 1. In addition, the control system may comprise one or more scanners 12, 13 for obtaining information about the environment of the vehicle 1. At least one first scanner 12 may be adapted at the front part of the mining vehicle 1, and at least one second scanner 13 may be adapted at the rear part of the vehicle 1. This allows the scanners 12, 13 to be used for observing both travel directions A and B of the vehicle 1. The scanners may be laser scanners, ultrasound scanners or corresponding devices for observing the environment of the mining vehicle.

Figure 2:
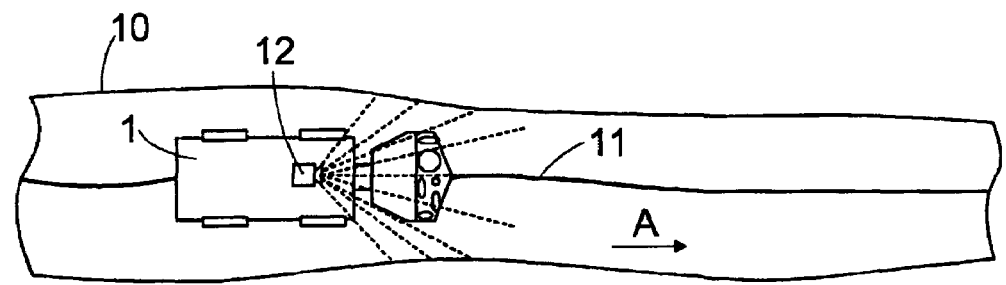
FIG. 2 is a schematic top view of a mining vehicle of the invention, FIG. 3 schematically shows an environmental model stored in a control system of a mining vehicle, FIGS. 4 and 5 schematically show erroneous positioning of a mining vehicle relative to an environmental model, and FIG. 6 schematically shows a position and direction found by an initialization algorithm that best match an environmental model.

FIG. 2 shows a mining device 1 adapted to drive along a predetermined route 11 in a mine tunnel 10. The route 11 may be created by driving the vehicle 1 manually in the mine at the same time as the directions and travelled distances of the vehicle 1 are stored in an electronic map in the control system. For this purpose, the control system includes an x, y coordinate system descriptive of the working space of the vehicle 1 and illustrated below in FIG. 3. During the teaching drive, environmental data is also obtained with the scanner 12 about the topology of the surfaces delimiting the route 11. In the control system, the environmental data can be used to create an environmental model for the route 11 and utilize it in positioning. In automatic drive, the control system controls the vehicle 1 by means of the electronic map along the taught route 11. At required intervals, the positioning can be checked for instance by comparison with the environmental model, thereby ensuring that the vehicle 1 is on the route 11. The environmental model may be stored in the control unit of the mining vehicle, from where it is read. Alternatively, the control unit of the mining vehicle may be adapted to read the environmental model from outside the mining vehicle by means of the data transfer connection. In the latter implementation, a plurality of different mining vehicles may use the same environmental model.

Figure 3:
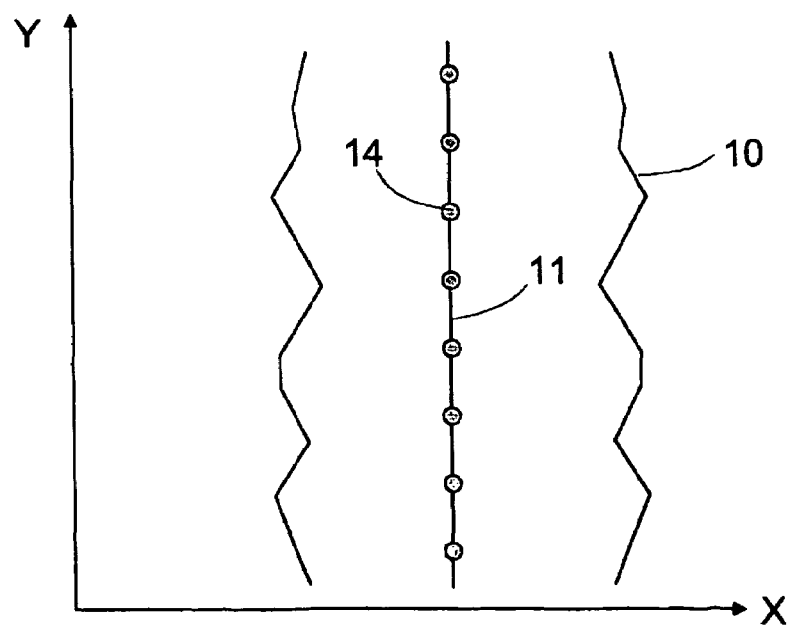

FIG. 3 shows, in a highly simplified manner, an electronic environmental model generated in an x, y coordinate system in the control system of the mining vehicle 1 for part of a route 11. Among other things, the environmental model describes the topology of the mining tunnel 10 or other fixed objects in the mine. The environmental model may be created by scanning the route 11 to be driven. Furthermore, the environmental model shows route points 14 indicating the position of the preplanned route 11 in the mine. In the environmental model, the route points 14 may be generated in advance at given intervals, e.g. at intervals of two metres. The x, y coordinates of each route point 14 are accurately known to the control system.

FIGS. 4 and 5 illustrate the operation of an initialization algorithm. The figures show the mining vehicle 1 at the point where the algorithm assumes it is located relative to the environmental model. In FIG. 4, the initialization algorithm indicates that the assumed position of the mining vehicle 1 in the lateral direction C is erroneous. In FIG. 5, in turn, the assumed direction of the mining vehicle 1 is erroneous. As is seen in FIGS. 4 and 5, the assumed position or direction is erroneous if the result obtained with the scanner 12 does not match the environmental model in the control system. However, the algorithm is adapted to search for the position and direction of the vehicle as long as the scanned points of the scanning and the environmental model match with a sufficient accuracy. This is illustrated in FIG. 6. Once the initialization algorithm has found the position and direction of the vehicle 1, automatic control for driving the vehicle 1 in the mine can be started.

The initialization algorithm is executed while the mining vehicle 1 is stopped. Before the algorithm is executed, a search range 15 within which the control system is to search for the position and direction of the vehicle 1 can be outlined. As a first limit 16 of the search range 15 can be determined some route point 14 behind the vehicle 1, and as a second limit 17 some route point 14 in front of the vehicle 1, as is shown in FIG. 6. Accordingly, the search range 15 is generated between the limits 16 and 17. The search range 15 can be outlined for instance by the operator indicating the limits 16 and 17 by means of the second control unit 7 in the control room 8. The operator usually has quite a good idea of the position of the vehicle 1. The use of an outlined search range 15 eliminates the need for the control system to go through the entire route 11 when searching for the position and direction of the vehicle; instead, the initialization algorithm can be executed for the desired part of the route 11, which substantially speeds up the initialization.

The initialization algorithm includes a plurality of successive steps. The one or more scanners 12, 13 comprised by the control system are used to scan the environment of the vehicle 1. To improve the accuracy, a plurality of scannings can be performed, out of which the value best describing the situation is selected by utilizing statistical methods, e.g. the median, for each scanned direction. The control system then assumes the position of the vehicle within the search range and, furthermore, by utilizing this assumed position converts the results of the scanning, i.e. the scanned points, into x, y points in the coordinate system descriptive of the work space. The assumed position may be one route point of the limit 16 or 17 of the search range 15. Direction D, specified by the route point 14, can be selected as the direction of the vehicle. Once the coordinates are calculated, the initialization algorithm compares the x, y coordinates generated from the scanned points with the coordinates of the environmental model. As a result of the comparison, a deviation in direction x, y is obtained between the true position and the environmental model. The initialization is continued by keeping the position the same, but changing the direction of the vehicle by a step of a predetermined length. A suitable step may be 1 degree, for example. The algorithm again determines the x, y coordinates on the basis of the results of the scanner, and performs the comparison with the environmental model. The direction is again changed by a step, and the comparison with the environmental model is performed. The direction can be changed on both sides relative to the direction D of the route 11, and the number of steps to be performed can be predetermined such that the change in direction can total for instance 5 degrees on both sides relative to the direction of the route 11. The tolerance E of the change in direction can be specified in view of the curvature of the route 11 such that the tolerance on a curved portion of the route 11 is higher than on a straight portion of the route. Once all directions according to the tolerance E have been gone through for one position, and the comparisons with the environmental model are performed, the control system selects a new position to be observed within the search range 15. This position is used when the coordinates are again calculated, the direction of the route 11 being first assumed to be the direction, and, furthermore, by changing the direction in steps by a predetermined magnitude on both sides of the direction of the route 11. The algorithm may be adapted to select all route points 14 of the search range 15, one at a time, as the positions to be observed. As the position and direction of the vehicle 1, the algorithm selects the point and direction the coordinates calculated based on which best match the environmental model. This position and direction can be used as the initial value when starting to drive the vehicle 1 in the mine. In the drive, any possible need can be taken into consideration for correcting the position that arises when comparing the coordinate of the position selected with the environmental model.

When the calculated coordinates are compared with the environmental model in accordance with the algorithm, a correlation coefficient can be determined for each position and direction. The correlation coefficient is a parameter descriptive of how well the calculated coordinates and the environmental model match. By means of the correlation coefficient, the control system is able to select the starting position and direction for the vehicle 1.

Furthermore, it feasible that no search range is specified for the initialization, but an initial point is selected out of the route points. This initial point is used as the starting point, and one route point is selected at a time for observation. Criteria with which the coordinates of the scanned points are compared are predetermined in the control system. Such a route point and direction observed, by which the generated coordinates of the scanned points fulfil predetermined criteria can be selected as the initial value of the vehicle. Furthermore, limitations for the search process can be specified in the control system. A given number of route points can be selected in advance, the position of the points to be selected can be delimited or the selection can be carried out during a given time. If a route point fulfilling the criteria is not found, the search can be interrupted and the operator requested to specify a new initial point. The criteria can be determined for instance such that instead of an exactly correct value, an accuracy of for instance 80% is sufficient. Calculus of probability can be utilized in the specification of the criteria.

The initialization of position and direction according to the invention can be applied also to mining vehicles controlled by an operator with remote control from a control room. Such a mining vehicle 1 is provided with a video camera 20 or the like, the data obtained from which is transferred to the operator in the control room 8. The control room 8 may comprise controls allowing the operator to steer the mining vehicle 1 based on image data.

The method of the invention can be implemented by executing a computer program in a processor of a computer comprised by the control system. The computer program implementing the method of the invention can be stored in a memory of the control system, or the program can be loaded into the computer from a memory means, such as a CD ROM, for example. Furthermore, the computer program may be loaded from another computer for instance via a data network into a device comprised by the control system of the mining vehicle.

Situations also arise where an environmental model exists, but no route to be driven is yet specified for the mining vehicle. The situation may be such for instance when a new mine or part thereof is taken into use. For this reason, the control system may be adapted to generate the assumed route on the basis of two or more points given by the operator for the initialization. For example, the operator may give the initial point and end point of the route, and the control unit then generates the route between said points. This way the position and direction of the mining vehicle are initialized according to the invention.

Although only unmanned mining vehicles were described above, the initialization of position and direction according to the invention can also be applied to usual manned mining vehicles, should it facilitate the control thereof.

The drawings and the related description are only intended to illustrate the inventive idea. The details of the invention may vary within the scope of the claims.

The invention claimed is:

1. A method of initializing the position and direction of a mining vehicle when starting to drive the vehicle in the mine, the mining vehicle comprising a movable carrier and a control system, and wherein the control system is arranged to read an electronic environmental model including data on coordinates of an environment delimiting a route; and a preplanned route including at least the coordinates of route points of the route to be driven, the method comprising:

scanning the environment of the mining vehicle and determining scanned points on the basis of obstacles detected by the scanning;

determining a search range including at least part of the route points of the preplanned route of the mining vehicle;

selecting each route point within the search range at a time as the position of the mining vehicle;

calculating coordinates for the scanned points of the scanning by using each route point within the search range and at least one direction;

comparing the calculated coordinates of the scanned points with the coordinates of the points in the environmental model;

and selecting such a route point and direction as the initial values of the vehicle, by which the calculated coordinates of the scanned points best match the coordinates of the points in the environmental model, and the position of the selected route point and the selected direction are used as the initial values when starting to drive the vehicle in the mine.

2. A method as claimed in claim 1, comprising estimating the position of the vehicle when starting to drive the vehicle in the mine, and outlining the search range based on the position, the search range comprising only part of the route points specifying the route driven.

3. A method as claimed in claim 1, comprising estimating the position of the vehicle when starting the drive the vehicle in the mine, outlining the search range based on the position, the search range comprising only part of the route points specifying the route driven, and outlining the search range manually by an operator.

4. A method as claimed in claim 1, comprising giving the control system at least two points specifying the assumed route, generating the assumed route in the control system based on the position of the points given, and performing the initialization based on the assumed route and the environmental model.

5. A method of initializing the position and direction of a mining vehicle, the mining vehicle comprising a movable carrier and a control system, and wherein the control system is arranged to read an electronic environmental model including data on coordinates of an environment delimiting a route: and a preplanned route including at least the coordinates of route points of the route to be driven, the method comprising:

scanning the environment of the mining vehicle and determining scanned points on the basis of obstacles detected by the scanning;

determining a search range including at least part of the route points of the preplanned route of the mining vehicle;

selecting each route point within the search range at a time as the position of the mining vehicle;

calculating coordinates for the scanned points of the scanning by using each route point within the search range and at least one direction;

selecting the direction of the route at the route point observed as the direction, changing the direction in steps by a predetermined tolerance for each route point observed relative to a direction of the route specified by the route point, calculating the coordinates of the scanned points for each direction, and comparing, based on each direction, the calculated coordinates of the scanned points with the environmental model;

selecting such a route point and direction as the initial values of the vehicle, by which the calculated coordinates of the scanned points best match the coordinates of the points in the environmental model, and the position of the selected route point and the selected direction are used as the initial values when starting to drive the vehicle in the mines.

6. A method of initializing the position and direction of a mining vehicle, the mining vehicle comprising a movable carrier and a control system, and wherein the control system is arranged to read an electronic environmental model including data on coordinates of an environment delimiting a route; and a preplanned route including at least the coordinates of route points of the route to be driven, the method comprising:

scanning the environment of the mining vehicle and determining scanned points on the basis of obstacles detected by the scanning;

determining a search range including at least part of the route points of the preplanned route of the mining vehicle;

selecting each route point within the search range at a time as the position of the mining vehicle;

calculating coordinates for the scanned points of the scanning by using each route point within the search range and at least one direction;

performing a plurality of scannings, determining a median for each direction of the scanning based on the scannings, and using the median determined for each direction in the determination of the scanned points;

comparing the calculated coordinates of the scanned points with the coordinates of the points in the environmental model;

selecting such a route point and direction as the initial values of the vehicle, by which the calculated coordinates of the scanned points best match the coordinates of the points in the environmental model, and the position of the selected route point and the selected direction are used as the initial values when starting to drive the vehicle in the mines.

7. A method of initializing the position and direction of a mining vehicle, the mining vehicle comprising a movable carrier and a control system, and wherein the control system is arranged to read an electronic environmental model including data on coordinates of an environment delimiting a route; and a preplanned route including at least the coordinates of route points of the route to be driven, the method comprising:

scanning the environment of the mining vehicle and determining scanned points on the basis of obstacles detected by the scanning;

determining a search range including at least part of the route points of the preplanned route of the mining vehicle;

selecting each route point within the search range at a time as the position of the mining vehicle;

calculating coordinates for the scanned points of the scanning by using each route point within the search range and at least one direction;

comparing the calculated coordinates of the scanned points with the coordinates of the points in the environmental model;

determining a correlation coefficient based on a comparison of the compatibility of the coordinates of each scanned point and the environmental model, and selecting the initial values by comparing the generated correlation coefficients with each other;

selecting such a route point and direction as the initial values of the vehicle, by which the calculated coordinates of the scanned points best match the coordinates of the points in the environmental model, and the position of the selected route point and the selected direction are used as the initial values when starting to drive the vehicle in the mines.

8. A mining vehicle, comprising:
a movable carrier;
a control system including at least one control unit arranged to read an electronic environmental model including data on coordinates of an environment delimiting a route; and a preplanned route including at least the coordinates of route points of the route to be driven;
at least one scanner for detecting obstacles in the environment of the vehicle;
the control system is arranged to determine scanned points on the basis of the results of the scanning,
and wherein
the control system is arranged to calculated coordinates for the scanned points by using the position of the route points within a predetermined search range and at least one direction;
the control system is arranged to compared the calculated coordinates of the scanned points with the coordinates of the points in the environmental model;
and the control system is arranged to select such a route point and direction as the initial values of the vehicle when starting to drive the vehicle in the mine, by which the calculated coordinates of the scanned points best match the coordinates of the points in the environmental model.

9. A method of initializing the position and direction of a mining vehicle when starting to drive the vehicle in the mine,
the mining vehicle comprising a movable carrier and a control system, and wherein the control system is arranged to read an electronic environmental model including data on coordinates of an environment delimiting a route; and a preplanned route including at least the coordinates of route points of the route to be driven, said method comprising:
scanning the environment of the mine vehicle, and determining scanned points on the basis of obstacles detected by the scanning;
the method further comprising
selecting one route point as the initial point of the search;
selecting a plurality of other route points for observation starting from the initial point;
calculating coordinates for the scanned points of the scanning by using the selected route points and at least one direction;
comparing the calculated coordinates of the scanned points with the coordinates of the points in the environmental model;
and selecting such a route point and direction as the initial value of the vehicle, by which the calculated coordinates of the scanned points fulfill a predetermined criterion, and the position of the selected route point and the selected direction are used as the initial values when starting to drive the vehicle in the mine.

10. A method as claimed in claim 9, comprising delimiting the number of route points to be observed.

11. A mining vehicle, comprising:
a movable carrier;
a control system including at least one control unit arranged to read an electronic environmental model including data on coordinates of an environment delimiting a route; and a preplanned route including at least the coordinates of route points of the route to be driven;
at least one scanner for detecting obstacles in the environment of the vehicle;
the control system is arranged to determine scanned points on the basis of the results of the scanning, and wherein
the control system is arranged to calculate the coordinates of the scanned points by using one selected route point and at least one direction as the initial point;
the control system is arranged to calculated coordinates of the scanned points by using a plurality of route points starting from the initial point;
the control system is arranged to compare the calculated coordinates of the scanned points with the environmental model;
and the control system is arranged to select such a route point and direction as the initial values of the vehicle when starting to drive the vehicle in the mine, by which the calculated coordinates of the scanned points fulfill a predetermined criterion.

* * * * *